US012661303B2

(12) United States Patent
Wu et al.

(10) Patent No.: US 12,661,303 B2
(45) Date of Patent: Jun. 23, 2026

(54) MEDICAL DEVICE FOR ROLLING AND MIXING A MEDICAMENT WITHIN A MEDICAMENT VIAL ALONG A TRACK

(71) Applicant: Genzyme Corporation, Cambridge, MA (US)

(72) Inventors: Haiming Wu, Weston, MA (US); Eric Raymond Schiller, Cambridge, MA (US); Alejandra Linares Martinez, Boonton, NJ (US); Martin Michael Coyne, III, Boonton, NJ (US); Katherine Ford Brigham, Boonton, NJ (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 18/960,617

(22) Filed: Nov. 26, 2024

(65) Prior Publication Data

US 2026/0144707 A1 May 28, 2026

(51) Int. Cl.
*B01F 29/30* (2022.01)
*A61J 1/20* (2006.01)

(52) U.S. Cl.
CPC ............. *A61J 1/2003* (2015.05); *B01F 29/30* (2022.01)

(58) Field of Classification Search
CPC ................................ B01F 29/30; B65G 69/30
USPC .............. 366/218–220; 221/194; 193/38, 41; 206/219–222
See application file for complete search history.

(56) References Cited

U.S. PATENT DOCUMENTS

| | | | | | |
|---|---|---|---|---|---|
| 623,615 | A * | 4/1899 | Mullan | B65G 63/004 193/41 |
| 661,904 | A * | 11/1900 | Browne | B60P 1/4407 193/41 |
| 1,065,989 | A * | 7/1913 | Verbeke | A63H 19/30 5/511 |
| 1,076,593 | A * | 10/1913 | Martin | B65G 69/30 193/41 |
| 1,192,705 | A * | 7/1916 | Taliaferro et al. | G06M 7/04 193/38 |

(Continued)

FOREIGN PATENT DOCUMENTS

| | | | | |
|---|---|---|---|---|
| AU | 2009222545 A1 * | 4/2010 | B65G 69/30 |
| CA | 2645690 A1 | 6/2009 | |

(Continued)

OTHER PUBLICATIONS

Needle-based injection systems for medical use requirements and test methods, Part 1: Needle injection systems, ISO 11608 1:2014(E), Third Edition, Switzerland, ISO, Dec. 15, 2014, pp. 1-13.

(Continued)

*Primary Examiner* — Charles Cooley
(74) *Attorney, Agent, or Firm* — Fish & Richardson P.C.

(57) ABSTRACT

A medical device for mixing a medicament contained within a medicament vial, wherein the medical device comprises a track configured to support the medicament vial, and wherein the track comprises an inclined first track section arranged such that, in use, the medicament vial can roll along the track to mix the medicament contained within the medicament vial. A system comprising the medical device and a medicament vial containing the medicament. A method for using the medical device.

15 Claims, 9 Drawing Sheets

(56) References Cited

U.S. PATENT DOCUMENTS 1,298,905 A * 4/1919 Dallman et al. ........ B65G 69/30 193/41
1,641,998 A * 9/1927 Von Der Horst ........ B65G 7/10 193/17
1,978,485 A * 10/1934 Brodell .................... B65G 7/12 193/41
2,233,118 A * 2/1941 Williams ................ F25D 25/00 193/38
2,252,493 A * 8/1941 Dennis .................... G07F 11/34 221/152
2,380,910 A * 7/1945 Newton .................... B65B 1/22 366/218
2,382,191 A * 8/1945 Weichselbaum ........ A47F 1/087 193/27
2,427,958 A * 9/1947 Gibson ................... A47F 1/087 193/38
2,643,102 A * 6/1953 Bashford ................ B01F 29/33 414/420
2,711,241 A * 6/1955 Abrahamsen ........... F25D 25/00 221/256
2,711,321 A * 6/1955 Mcgraw, Sr. ...... A63B 57/0006 312/49
2,742,288 A * 4/1956 Brunel ................... A63C 19/10 193/38
2,901,118 A * 8/1959 Beesley .................... A47F 1/08 D20/1
3,083,547 A * 4/1963 Stevens ................. F25D 31/007 366/144
3,127,177 A * 3/1964 Benkoe ............. A63B 57/0006 473/137
3,286,846 A * 11/1966 Brandes .................. A47F 1/082 312/45
3,318,455 A * 5/1967 Takahashi ............... A47F 1/087 312/45
3,322,303 A * 5/1967 Grindinger ............. G07F 11/34 221/298
3,348,733 A * 10/1967 Johnson .................. G07F 11/34 221/6
3,379,294 A * 4/1968 Van Liew, Jr. ......... A47F 1/087 193/41
3,501,131 A * 3/1970 Grantham ............... B01F 31/22 366/202
3,638,910 A * 2/1972 Nellis ..................... B66F 7/243 193/41
3,662,898 A * 5/1972 Baxendale .............. G07F 11/34 221/131
3,696,735 A * 10/1972 Boertje ............... A47J 37/1214 99/330
3,795,345 A * 3/1974 Baxendale .............. G07F 11/32 221/125
4,132,214 A * 1/1979 Schnurr ............... A63B 47/002 124/1
4,152,078 A * 5/1979 Pilgrim .................. A01N 25/08 366/144
4,235,399 A * 11/1980 Shorey ...................... B64C 1/22 14/72.5
4,333,246 A * 6/1982 Sullivan .................. F26B 25/02 34/418
4,423,818 A * 1/1984 Spamer ..................... A47F 1/12 193/38
4,498,569 A * 2/1985 Tanaka .................... G07F 11/34 221/281
4,729,480 A * 3/1988 Groover .................. G07F 11/28 211/59.2
4,917,264 A * 4/1990 Gasiel ..................... G07F 11/34 221/124
5,031,937 A 7/1991 Nellhaus
5,080,256 A * 1/1992 Rockola .................. G07F 11/34 221/312 R
5,105,741 A * 4/1992 Leary ...................... E01B 23/00 104/106
5,199,598 A * 4/1993 Sampson ................ G07F 11/28 221/301
5,247,798 A * 9/1993 Collard, Jr. ............. F25B 21/02 221/281
5,325,558 A * 7/1994 Labreche ............... B65G 69/30 414/537
5,346,222 A * 9/1994 Luther, Sr. ......... A63B 57/0006 473/137
5,356,033 A * 10/1994 Delaney .................. A47F 1/087 221/277
5,368,190 A * 11/1994 Hieb ....................... G07F 11/34 221/281
5,377,866 A * 1/1995 Watters, II ................ A47F 1/12 221/256
5,462,198 A * 10/1995 Schwimmer ............ A47F 1/087 221/281
5,464,223 A * 11/1995 Dermott ............. A63B 57/0006 473/137
5,540,622 A * 7/1996 Gold ...................... A63G 21/18 472/117
5,566,806 A * 10/1996 Reale ...................... G07F 11/34 194/215
6,086,934 A 7/2000 Khatchadourian et al.
6,152,323 A * 11/2000 Immel ..................... G07F 11/34 221/129
6,173,582 B1 * 1/2001 Hixson ................... F25D 25/00 62/457.4
6,206,237 B1 * 3/2001 Dillon ...................... B65G 1/08 221/312 R
6,328,659 B1 * 12/2001 Peterson ............ A63B 57/0006 473/137
6,685,051 B2 * 2/2004 Zangari ................... F25D 25/00 221/129
6,834,775 B1 * 12/2004 Collins ............... G07F 17/0092 221/124
6,862,896 B1 * 3/2005 Seidl ......................... F25D 3/08 220/592.16
7,918,365 B2 * 4/2011 White ..................... G07F 11/10 221/312 R
8,047,400 B1 * 11/2011 Luberto .................. G07F 11/34 221/312 R
8,365,950 B2 * 2/2013 Yuyama ................ G07F 11/165 221/241
8,757,433 B2 * 6/2014 Machers ................. G07F 11/34 221/202
8,833,601 B2 * 9/2014 Zacherle ................ B65D 71/36 221/30
9,775,326 B1 * 10/2017 MacNeil ................ A01K 29/00
10,272,401 B2 * 4/2019 Lee ......................... B01F 29/30
10,438,438 B2 * 10/2019 Lucker ............... B65D 83/0409
2002/0043509 A1 * 4/2002 Lajeunesse ............. A47F 1/087 211/74
2007/0289990 A1 * 12/2007 Artsiely .................. G07F 11/30 221/251
2008/0067188 A1 * 3/2008 White ..................... G07F 11/10 221/123
2010/0320222 A1 * 12/2010 White ..................... G07F 11/10 221/191
2012/0282075 A1 11/2012 Knight et al.
2013/0105509 A1 * 5/2013 Gelardi ................... A47F 1/087 221/194
2014/0016431 A1 * 1/2014 Takenaka ................ B01F 31/24 366/108
2014/0246342 A1 * 9/2014 Domkowski ............. A61J 1/20 206/222
2015/0013081 A1 * 1/2015 Breeden, III .......... B65G 69/30 14/69.5
2017/0347622 A1 * 12/2017 Macneil .................. B60R 3/007
2018/0304213 A1 * 10/2018 Lee ......................... B01F 29/30

FOREIGN PATENT DOCUMENTS

CA 2690589 A1 * 8/2010 ............. A47F 1/087
CA 2907109 A1 * 3/2016
CA 2942323 A1 * 3/2017 ............. B60Q 1/307
CN 105668108 A 6/2016

(56) References Cited

FOREIGN PATENT DOCUMENTS

| | | | | | |
|---|---|---|---|---|---|
| CN | 106524662 | A | | 3/2017 | |
| CN | 115504146 | A | * | 12/2022 | |
| EP | 49737 | A | * | 4/1982 | .............. F26B 15/04 |
| EP | 2273461 | A1 | * | 1/2011 | .............. G07F 11/20 |
| WO | WO 2020/206450 | A1 | | 10/2020 | |
| WO | WO-2020232202 | A1 | * | 11/2020 | .............. B60P 1/433 |

OTHER PUBLICATIONS

International Search Report and Written Opinion in International Appln. No. PCT/US2025/056832, mailed on Mar. 20, 2026, 13 pages.

* cited by examiner

MEDICAL DEVICE FOR ROLLING AND MIXING A MEDICAMENT WITHIN A MEDICAMENT VIAL ALONG A TRACK

TECHNICAL FIELD

This application relates to a medical device for mixing a medicament contained within a medicament vial, and a method for mixing a medicament in a medicament vial.

BACKGROUND

Providing intravenous (IV) therapy at a patient's home rather than at a traditional healthcare setting such as an IV infusion clinic may offer significant benefits for both the patient and healthcare systems. IV infusion clinic visits can be frequent and extensive. Some patients may cite the expense and inconvenience of in-clinic treatment as a significant barrier to therapy and may prefer to receive therapy in their home. Delivery of IV therapies at home can provide patients with autonomy and improved convenience, and may decrease burden on the overall healthcare system.

Some medicaments for IV infusion may be provided in a pre-prepared (e.g., pre-mixed) form and may be prefilled in a final reservoir such as a flexible IV container, ready for IV administration by a user. However, in some instances, for reasons such as medicament stability, a medicament may instead need to be prepared immediately prior to infusion and may therefore be provided as two or more medicament constituents that must be combined to produce the final medicament for administration. As an example, a medicament vial containing a lyophilized drug may need to be reconstituted using a liquid contained in a different medicament vial to produce a final medicament for IV delivery.

After two or more medicament constituents have been added to a medicament vial, the contents of the vial may need to be mixed to produce a satisfactory medicament for administration to a patient. Mixing of the medicament vial contents may require gentle swirling of the medicament vial by hand. Rapid, vigorous swirling or shaking of the medicament vial may damage the medicament or medicament constituents (e.g. a lyophilized powder, medication suspension, or formulation surfactants) contained within the medicament vial. For example, the medicament or constituents may become damaged through protein denaturing or undesired protein aggregation, for example. Additionally or alternatively, rapid, vigorous swirling or shaking of the medicament vial may generate undesirable foaming or bubbles. Therefore, gentle swirling may be employed to minimise such damage or unwanted foaming and bubbles. In some examples, the intensity of swirling is further reduced through intermittent or periodic manipulations (e.g., swirl for 10 seconds at 15 second intervals).

In a clinic setting, medicament preparation may be performed by highly competent, trained clinicians (typically such as pharmacists, pharmacy technicians, or nurses). In such a clinic setting, extensive procedures for medicament preparation can exist to ensure the preparation of sterile and stable medicaments. Such clinicians may be trained in proper medicament mixing techniques such as gentle swirling. Nevertheless, such preparation may be time consuming and still subject to human error, and "gentle swirling" is inherently a subjective instruction, even to those with clinical training or experience.

In a home setting, extensive procedures for preparing a sterile and stable medicament may not be in place. Patients (or their potentially non-clinician caregiver) may in some instances be tasked with performing some or all of the medicament preparation themselves, wherein the patient or non-clinician caregiver may have little or no previous experience of doing so. Patients or non-clinician caregivers may be inclined to vigorously shake or vibrate a medicament vial in an attempt to mix a medicament, despite instructions to the contrary. Alternatively, the patient may require the support of a healthcare professional such as a traveling nurse to visit the home and assist with each preparation and/or administration. Regardless of the user's professional title, training, or preparation experience, the home environment may lack the medicament preparation infrastructure inherent to in-clinic preparations, including a sterile, well-lit preparation environment (e.g., the presence of a laminar flow hood) and bulk preparation supplies (e.g., syringes, needles, gloves). This may reduce the overall benefit of home infusion for certain medications.

There may be a desire for improvements in the preparation of medicaments, for example the preparation of a medicament in a medicament vial.

SUMMARY

According to a first aspect of the present disclosure, there is provided a medical device for mixing a medicament contained within a medicament vial, the medical device comprising a track configured to support the medicament vial, wherein the track comprises an inclined first track section arranged such that, in use, the medicament vial can roll along the track to mix the medicament contained within the medicament vial.

The first inclined track section may be substantially helical such that, in use, the first inclined track section guides the medicament vial to roll along a substantially helical path.

The track may comprise a plurality of discrete track sections, the plurality of discrete track sections including the first track section, wherein the plurality of discrete track sections are arranged such that the medicament vial is guided to roll along each track section of the plurality of discrete track sections sequentially.

The plurality of discrete track sections may be vertically stacked such that the plurality of discrete track sections guide the medicament vial to roll in a substantially zigzagging path.

The inclined first track section may be configured to guide the medicament vial to roll along a substantially straight first path in a first direction, and the plurality of discrete track sections may further comprise an inclined second track section that is configured to guide the medicament vial to roll along a substantially straight second path in a second direction that is different to the first direction.

When the medical device is in use, a horizontal component of the first direction may be in a substantially opposite direction to a horizontal component of the second direction.

The first track section may comprise a support surface along which the medicament vial is guided to roll, wherein the support surface is undulating.

The track may comprise a first lateral guide wall configured to retain the medicament vial on the track as the medicament vial rolls along the track.

The track may comprise a support surface along which the medicament vial is guided to roll, wherein the first lateral guide wall is arranged along a first edge of the support surface.

The track may comprise a second lateral guide wall to retain the medicament vial on the track as the medicament vial rolls along the track, wherein the second lateral guide wall is arranged along a second edge of the support surface that is opposite the first edge of the support surface.

The medical device may further comprise a housing in which the track is at least partially contained, wherein the at least one lateral guide wall comprises a wall of the housing.

The medical device may further comprise a housing in which the track is at least partially contained, wherein the housing comprises at least one entry aperture through which the medicament vial may be positioned onto the track.

The housing may comprise a plurality of entry apertures, each entry aperture of the plurality of entry apertures allowing the medicament vial to be positioned onto a different corresponding position on the track.

The track may comprise a terminal track section configured to hold the medicament vial after the medicament vial has ceased rolling along the track, wherein the terminal track section comprises a stopping element configured to inhibit further rolling of the medicament vial.

The track may be configured such that the medicament vial can continuously roll along the track for between five and sixty seconds.

According to a second aspect of the present disclosure, there is provided a system comprising a medical device and a medicament vial containing the medicament. The medical device may be for mixing the medicament contained within a medicament vial, the medical device comprising a track configured to support the medicament vial, wherein the track comprises an inclined first track section arranged such that, in use, the medicament vial can roll along the track to mix the medicament contained within the medicament vial.

The first inclined track section may be substantially helical such that, in use, the first inclined track section guides the medicament vial to roll along a substantially helical path.

The track may comprise a plurality of discrete track sections, the plurality of discrete track sections including the first track section, wherein the plurality of discrete track sections are arranged such that the medicament vial is guided to roll along each track section of the plurality of discrete track sections sequentially.

The plurality of discrete track sections may be vertically stacked such that the plurality of discrete track sections guide the medicament vial to roll in a substantially zigzagging path.

The inclined first track section may be configured to guide the medicament vial to roll along a substantially straight first path in a first direction, and the plurality of discrete track sections may further comprise an inclined second track section that is configured to guide the medicament vial to roll along a substantially straight second path in a second direction that is different to the first direction.

When the medical device is in use, a horizontal component of the first direction may be in a substantially opposite direction to a horizontal component of the second direction.

The first track section may comprise a support surface along which the medicament vial is guided to roll, wherein the support surface is undulating.

The track may comprise a first lateral guide wall configured to retain the medicament vial on the track as the medicament vial rolls along the track.

The track may comprise a support surface along which the medicament vial is guided to roll, wherein the first lateral guide wall is arranged along a first edge of the support surface.

The track may comprise a second lateral guide wall to retain the medicament vial on the track as the medicament vial rolls along the track, wherein the second lateral guide wall is arranged along a second edge of the support surface that is opposite the first edge of the support surface.

The medical device may further comprise a housing in which the track is at least partially contained, wherein the at least one lateral guide wall comprises a wall of the housing.

The medical device may further comprise a housing in which the track is at least partially contained, wherein the housing comprises at least one entry aperture through which the medicament vial may be positioned onto the track.

The housing may comprise a plurality of entry apertures, each entry aperture of the plurality of entry apertures allowing the medicament vial to be positioned onto a different corresponding position on the track.

The track may comprise a terminal track section configured to hold the medicament vial after the medicament vial has ceased rolling along the track, wherein the terminal track section comprises a stopping element configured to inhibit further rolling of the medicament vial.

The track may be configured such that the medicament vial can continuously roll along the track for between five and sixty seconds.

The medicament may comprises a lyophilized drug and a diluent.

According to a third aspect of the present disclosure, there is provided a method for using any medical device disclosed herein, the method comprising:

causing the medicament vial to roll along the track of the medical device to mix the medicament contained within the medicament vial.

The method may further comprise:

positioning the medicament vial at an initial position on the track, wherein causing the medicament vial to roll along a track of the medical device to mix the medicament contained within the medicament vial comprises:

releasing the medicament vial at the initial position on the track such that the medicament vial rolls along the track to mix the medicament.

The medicament may comprise a lyophilized drug and a diluent.

BRIEF DESCRIPTION OF THE DRAWINGS

Exemplary embodiments of the present disclosure are described with reference to the accompanying drawings, in which.

DETAILED DESCRIPTION

One or more aspects of the present disclosure are directed to devices and methods for mixing a medicament contained within a medicament vial. Mixing may be assisted by the rolling of the medicament vial down a track of a medical device (i.e., medicament vial mixing device) according to one or more embodiments of the present disclosure.

One or more devices and/or methods disclosed herein may assist in the reconstitution of a medicament within a medicament vial. As a non-limiting example, one or more devices and/or methods disclosed herein may assist in mixing a lyophilized drug product and a diluent contained within a medicament vial.

Aspects of the present disclosure may increase the efficiency of mixing medicaments in medicament vials. One or more devices disclosed herein may allow a medicament in a medicament vial to be passively mixed by the device while a user prepares a next medicament vial for mixing by the device. As such, the overall preparation time for preparing a large number of medicament vials may be reduced.

Aspects of the present disclosure may allow the mixing of a medicament in a medicament vial to be performed in a manner which may be more predictable and consistent than one or more other methods of mixing medicaments, such as rolling a medicament vial between the hands of a user. Such improved predictability and consistency may reduce the risk of damaging the medicament (e.g., reduce a risk of protein aggregation) that may result from improper manipulations (e.g., vigorous shaking) by lay users.

Figure 1:
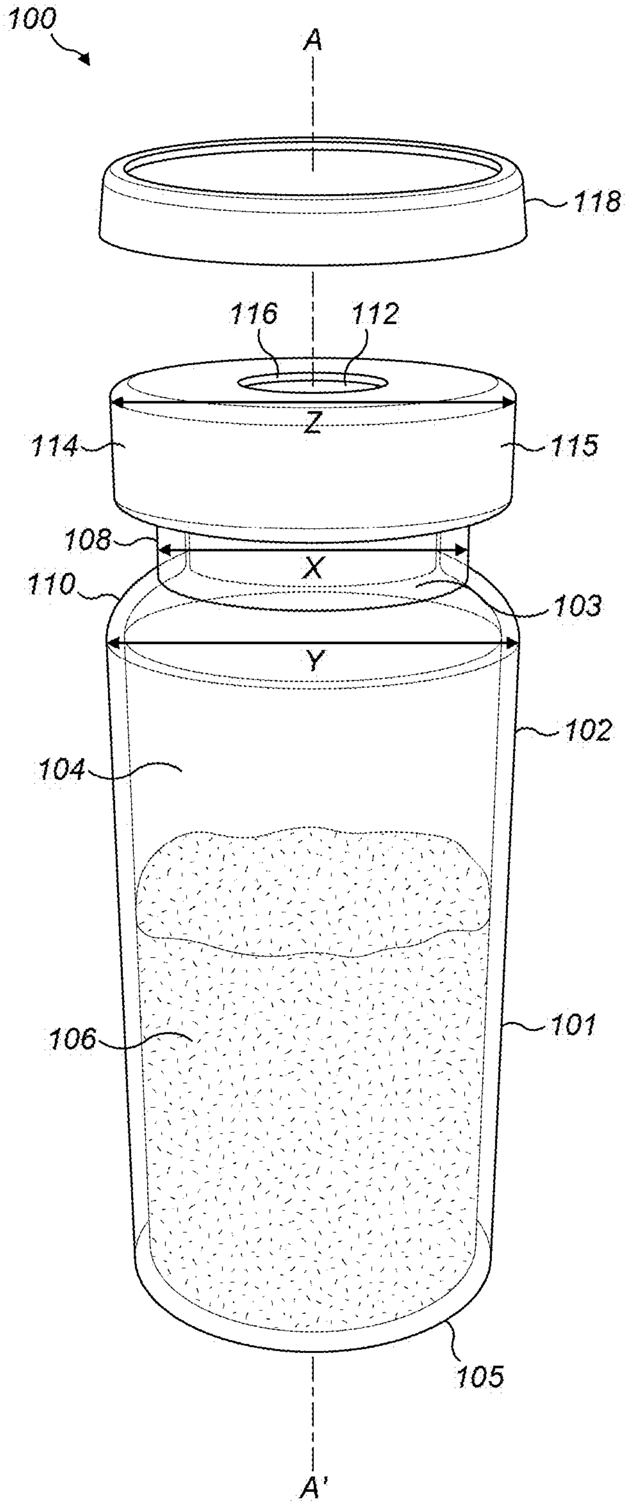
FIG. 1 shows a perspective view of a medicament vial suitable for use in one or more embodiments of the present disclosure.

FIG. 1 shows an example of a medicament vial 100 which may be used with one or more embodiments of the present disclosure.

The medicament vial 100 comprises a cylindrical body 102 extending along a longitudinal axis A-A' and containing a reservoir 104 for holding a medicament 106 or medicament constituent within. The body 102 has circumferential outer surface 101 and a substantially flat end surface 105. An outlet 103 is arranged at an opposite end of the body 102 to the end surface 105. The outlet 103 is in fluid communication with the reservoir 104 such that the medicament 106 may be extracted from the reservoir 104 via the outlet 103. FIG. 1 shows the outlet 103 being formed from a neck portion 108 of the medicament vial 100 that is coupled to the body 102 by a shoulder portion 110 of the vial 100, wherein the neck portion 108 extends along the longitudinal axis A-A' and has a diameter X perpendicular to the axis A-A' that is less than a diameter Y of the body 102 perpendicular to the axis A-A'.

A stopper 112 is located within the neck portion 108 to seal the outlet 103 and inhibit the medicament 106 from leaving the medicament vial 100. The stopper 112 may be formed from a polymer such as natural or synthetic rubber, a thermoplastic elastomer, or silicone. The stopper 112 is configured to be pierced by a hollow needle to bring the reservoir into fluid communication with the outside of the medicament vial 100, via the hollow needle, thereby allowing the medicament 106 to be extracted from the reservoir 104 via the hollow needle and/or allowing a further medicament component to be introduced into the reservoir 104 via the hollow needle.

A circular flange 114 extends radially from the neck portion 108, at an opposite end of the neck portion 108 to the end coupled to the body 102, the flange 114 having a diameter Z perpendicular to the axis A-A' that is greater than the diameter X of the neck portion 108 perpendicular to the axis A-A'. A crimp cap 115 may be arranged to at least partially surround the flange 114 such that the stopper 112 is retained in the neck portion 108. The crimp cap 115 has an aperture 116 to allow access to the stopper 112 by a hollow needle.

The crimp cap 115 may be formed from a flexible material such as aluminium, but other suitable materials may be used instead.

The medicament vial 100 may further comprise a vial cap 118 configured to cover the aperture 116 of the crimp cap 115 such that access to the stopper 112 via the aperture 116 is inhibited. The vial cap 118 may be coupled to the flange 114 or the stopper 112, and may be removed from the remainder of the medicament vial 100 to uncover the aperture 116 prior to use of the medicament 106. To remove the vial cap 118, a user may pull the vial cap 118 off the flange 114 or stopper 112, which may snap a connector that connected the vial cap 118 to the flange 114 or stopper 112. FIG. 1 shows the vial cap 118 after it has been uncoupled from the remainder of the medicament vial 100.

In some instances, the medicament 106 or medicament constituent within the vial 100 may be a liquid medicament or liquid medicament constituent, such as a diluent. In other instances, the medicament 106 may be a solid medicament or solid medicament constituent, such as a powdered medicament or medicament constituent or a crystallised medicament or medicament constituent. In some examples, the solid medicament or solid medicament constituent may comprise a lyophilized drug.

Some medicaments require preparation from their one or more medicament constituents shortly prior to administration (e.g., IV administration) of the medicament. For example, in some instances, a solid medicament constituent contained in a first medicament vial may be provided in a lyophilized form and require reconstitution using a liquid medicament constituent such as a diluent provided in a second medicament vial, whereby the lyophilized medicament constituent is dissolved into the suitable diluent to produce the required medicament. In other examples, a first liquid medicament constituent provided in a first medicament vial may require dilution using a second liquid medicament constituent provided in a second medicament vial. However, issues can arise during the process of preparing a medicament from its constituent parts. For example, there may be complications when transferring a diluent from one medicament vial to a lyophilized drug in a second medicament vial, or during mixing of two medicament constituents in a medicament vial.

Figure 2A:
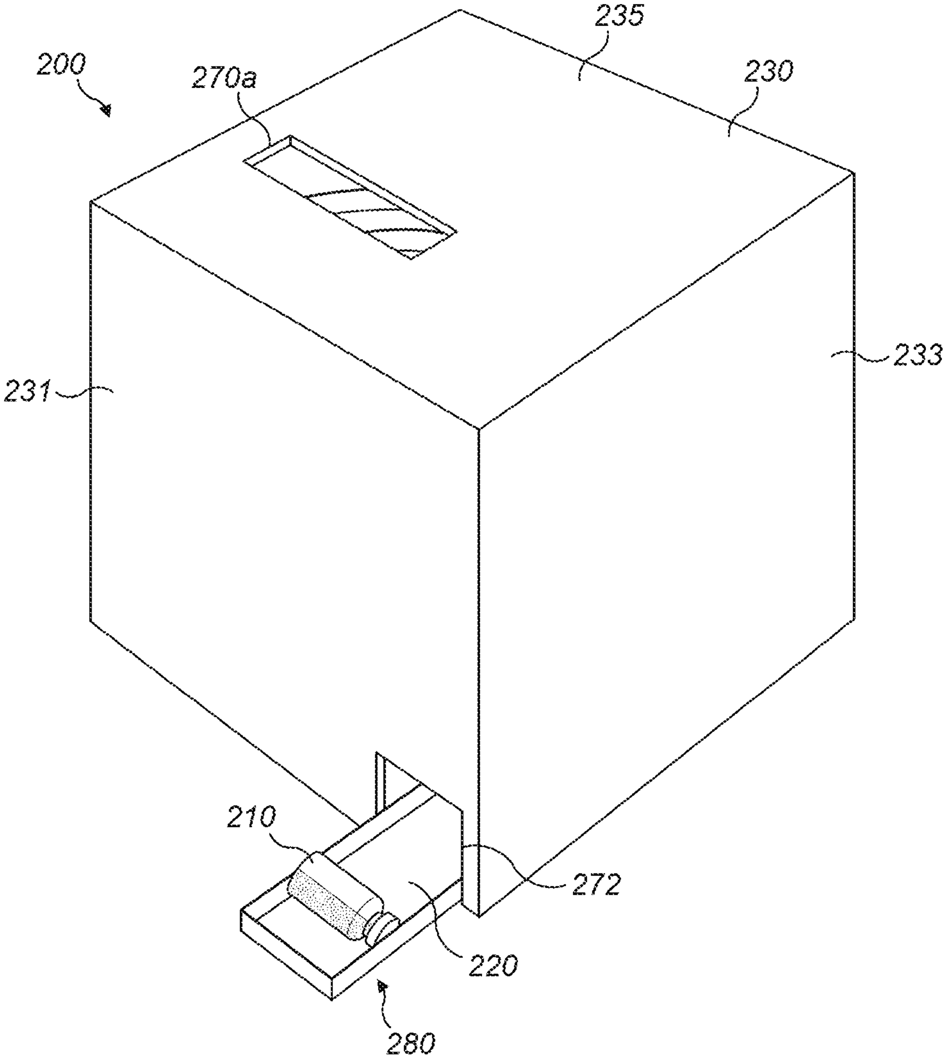
FIG. 2A shows a perspective view of a medical device according to a first embodiment of the present disclosure.
Figure 2B:
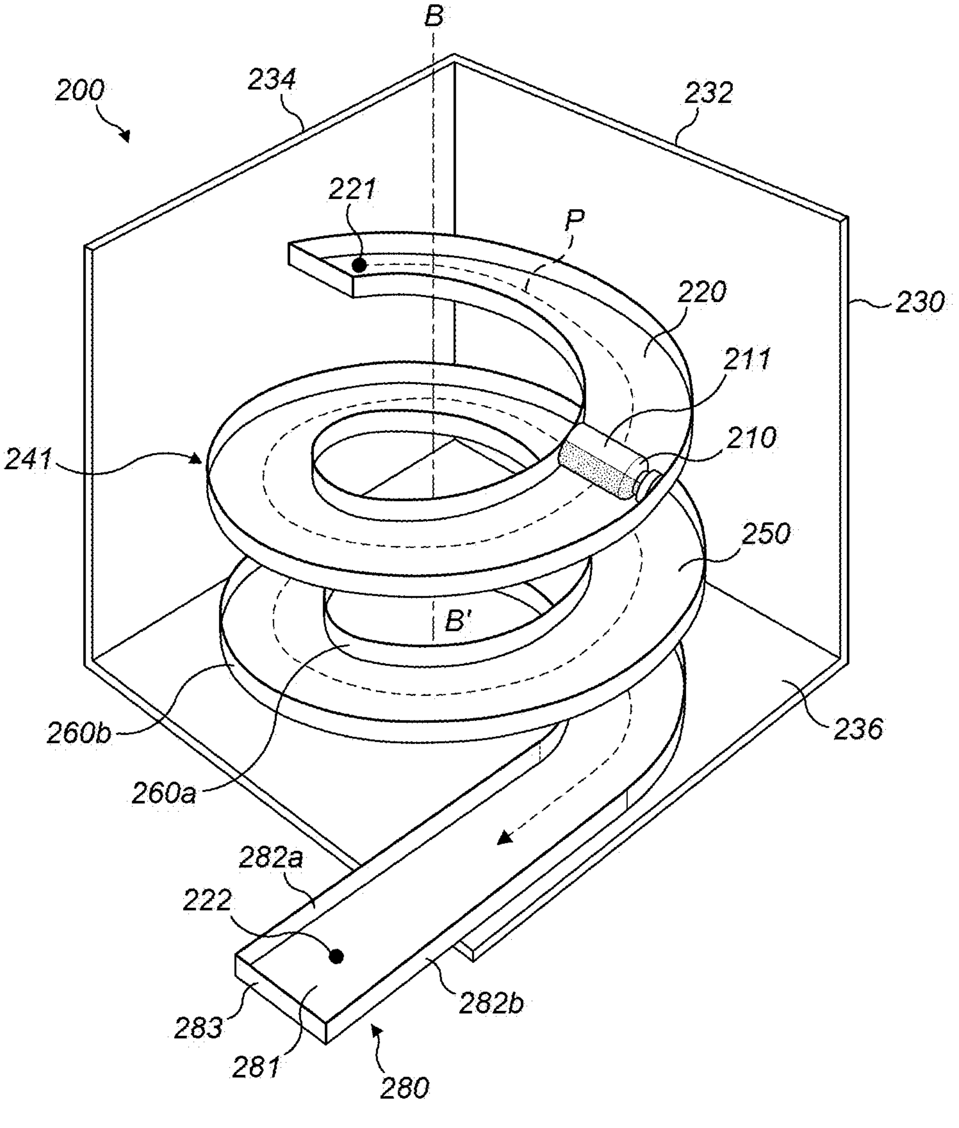
FIG. 2B shows a perspective view of the medical device of FIG. 2A, with a portion of a housing of the medical device hidden.
Figure 2C:
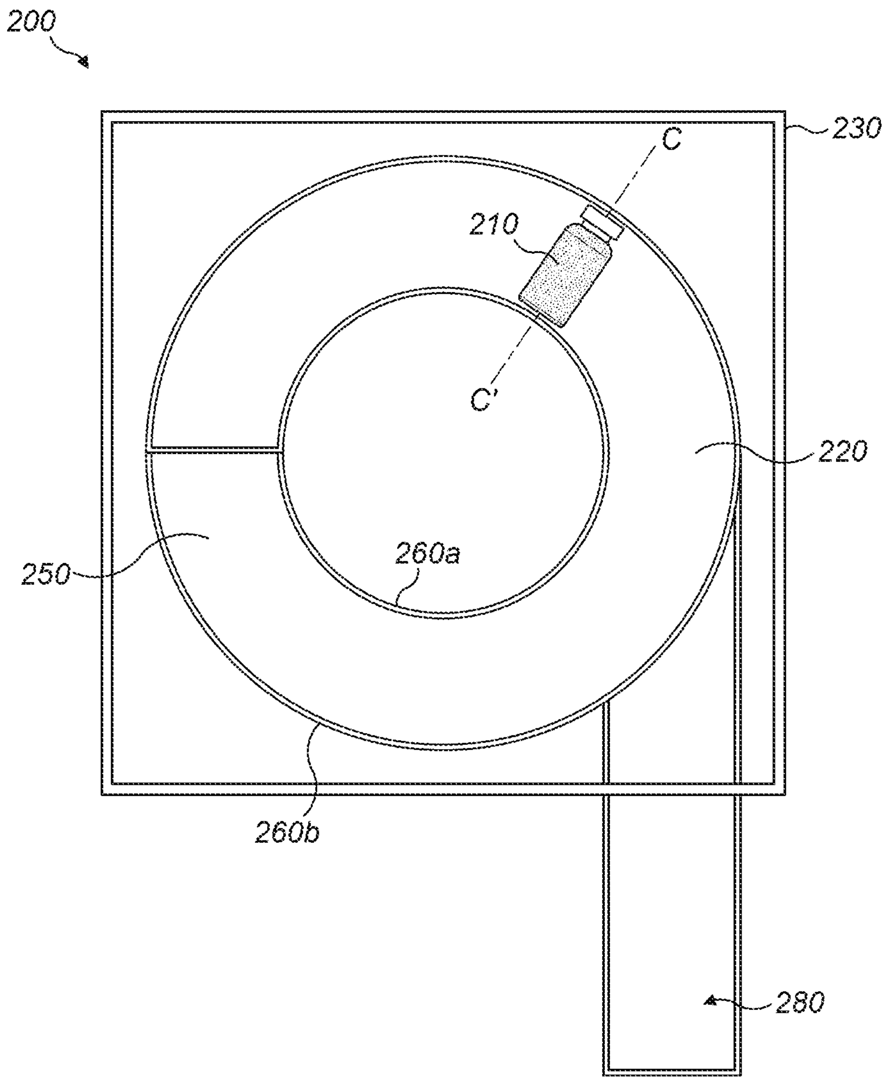
FIG. 2C shows a top view of the medical device of FIG. 2A, with a top wall of the housing hidden.

FIGS. 2A-2C show a medical device 200 in accordance with one or more embodiments of the present disclosure.

The medical device 200 can be used in the preparation of a medicament prior to administration of the medicament to a patient. More specifically, the medical device 200 may be used for mixing a medicament contained within a medicament vial 210, wherein the medicament vial 210 may be similar or identical to the medicament vial 100 previously described in relation to FIG. 1. A medicament contained within the medicament vial 210 can be mixed by rolling the medicament vial 210 down a track 220 of the medical device 200, wherein the rolling motion of the medicament vial 210 causes the contents of the medicament vial 210 to mix.

FIG. 2A is a perspective side-view of the medical device 200. The medical device 200 comprises a housing 230 which at least partially contains the track 220, which is configured to support the medicament vial 210.

FIGS. 2A and 2B show the housing 230 having a cuboid shape, with the housing 230 comprising a front wall 231 and opposing rear wall 232, opposing first and second side walls 233, 234 each coupling the front wall 231 and rear wall 232, and opposing top and bottom walls 235, 236 each coupling the front wall 231, rear wall 232, first side wall 233 and second side wall 234. Nevertheless, it should be understood that this configuration of the housing 230 is not meant to be limiting. For examples, in one or more other examples, the housing 230 may have a different number of walls than six wall and/or may have a different shape to cuboid, for example it may have a cylindrical shape.

The medical device 200 may be portable, such that it may be suitable for use and/or storage in a clinical setting such as a pharmacy and/or at a home of a patient, and such that it may be transported (e.g., carried) by a single person. In some examples, any external dimension of the medical device 200 may not exceed 100 cm. In some examples, any external dimension of the medical device 200 may not exceed 50 cm. In yet other examples, any external dimension of the medical device 200 may not exceed 30 cm.

In some examples, at least one of a height, a width and a depth of the housing 230 of the medical device 200 may be 100 cm or less. In some examples, at least one of a height, a width and a depth of the housing 230 of the medical device 200 may be 50 cm or less. In yet other examples, at least one of a height, a width and a depth of the housing 230 of the medical device 200 may be 30 cm or less.

FIG. 2B shows the medical device 200 of FIG. 2A with the first side wall 233, front wall 231 and top wall 235 removed so that the track 220 can be seen more clearly within the housing 230. FIG. 2C is a top-view of the medical device 200 of FIG. 2A, wherein the top wall 235 has been removed to more clearly see the track 220. The medicament vial 210 is shown in a different position on the track 220 in FIG. 2B compared to FIG. 2A.

As shown in FIG. 2B, the track 220 is elongate and is arranged such that the medicament vial 210 may roll along the track 220 to mix a medicament contained within the medicament vial 210. The track 220 is arranged such that, when the medical device 200 is in use, the medicament vial 210 may roll along an outer circumferential surface 211 of the medicament vial 210 from an initial position 221 on the track 220 to a final position 222 on the track 220, under gravity.

The track 220 comprises at least a first track section 241 along which the medicament vial 210 may roll. At least a portion of the first track section 241 is inclined to allow the medicament vial to roll along the track 220 from the initial position 221 to the final position 222 under gravity. The track 220 is configured to support the medicament vial 210 as it rolls along the track 220 and guide the medicament vial 210 along a path P as it rolls. As the medicament vial 210 rolls along the track 220, the rolling causes the contents of the medicament vial 210 to be mixed.

As shown in FIG. 2B, the first track section 241 may be substantially helical such that, when the medical device 200 is in use, the first track section 241 guides the medicament vial 210 to roll along a substantially helical path P. As shown in FIG. 2B, an axis B-B' of the helical first track section 241 may be being substantially vertical when the medical device 200 is in use. Providing a first track section 241 having a helical shape may allow the medical device 200 to be made relatively compact, since it may allow a relatively long first track section 241 to be provided with a relatively small footprint, which may be beneficial where the medical device 200 is to be used in a home setting.

FIG. 2B shows the helical first track section 241 comprising two and a half turns about the axis B-B' (i.e., the helical first track section 241 follows a path that rotates 900 degrees about the axis B-B'), however it should be understood that this is not meant to be limiting and that in one or more other examples, the helical first track section 241 may comprise fewer than two and a half turns about the axis B-B' (e.g., one turn or two turns) or greater than two and a half turns about the axis B-B' (e.g., three turns, four turns, five turns, six turns, or greater than six turns).

The track 220 (e.g., the first track section 241) comprises a support surface 250 along which the medicament vial 210 is guided to roll on it outer circumferential surface 211, and a pair of lateral guide walls 260*a*, 260*b* configured to retain the medicament vial on the track 220 (e.g., on the support surface 250) as the medicament vial rolls along the track 220. The lateral guide walls 260*a*, 260*b* may assist in guiding the medicament vial 210 to follow the path P.

As shown in FIG. 2B, the track 220 may be arranged to allow a plurality of medicament vials 210 to roll along the track 220 simultaneously, each guided along substantially the same path P by the track 220. In some embodiments, track 220 may be configured to guide (i.e., support, cooperate with a shape of or a dimension of) vials of multiple sizes with a single medical device 200.

FIG. 2A shows the housing 230 of the medical device 200 comprising an entry aperture 270*a* that provides access to the track 220. The entry aperture 270*a* is configured such that the medicament vial 210 may be positioned onto the track 220 (e.g., at the initial position 221) via the entry aperture 270*a*. For example, a user may insert the medicament vial 210 into the housing 230 via the entry aperture 270*a* to position the medicament vial 210 on the track 220 such that it may subsequently be released by the user and allowed to roll along the track 220 under gravity.

FIG. 2A show the entry aperture 270*a* arranged in the top wall 235 of the housing 230, adjacent the initial position 221 of the track 220. However, it should be understood that this is not meant to be limiting and that in one or more other examples, the entry aperture 270*a* may be arranged in a different wall of the housing 230 than the top wall 235, such as a side wall 233, 234, front wall 231 or rear wall 232.

FIG. 2A also shows the housing 230 of the medical device 200 comprising an exit aperture 272 that allows the medicament vial 210 to be removed from inside the housing 230 via the exit aperture 272. FIG. 2A shows the track 220 passes through the exit aperture 272 such that the medicament vial 210 rolls along the track 220 from inside the housing 230 (e.g., as shown in FIG. 2B) to outside the housing 230 (e.g., as shown in FIG. 2A), via the exit aperture 272. However, it should be understood that this is not meant to be limiting.

For instance, in one or more other examples, the track 220 may be arranged to end at the exit aperture 272 but not pass through the exit aperture 272, or else end within the housing 230 but not at the exit aperture 272. In these one or more examples, the medicament vial 210 may roll through the exit aperture 272 after it has left the track 220, or it may stop rolling within the housing 230 and be retrieved by a user via the exit aperture 272 (e.g., by a reaching through the exit aperture 272).

As shown in FIGS. 2A-2C, the track may comprise a terminal track section 280 arranged at an end of the track 220, the terminal track section 280 configured to hold the medicament vial 210 after the medicament vial 210 has ceased rolling along the track 220. The terminal track section 280 comprises a terminal track section support surface 281 on which the medicament vial 210 may rest, and a pair of terminal track section lateral walls 282*a,b* arranged at opposite edges of the terminal track section support surface 281, for retaining the medicament vial 210 on the terminal track section support surface 281. The terminal track section 280 further comprises a stopping element 283 configured to inhibit further rolling of the medicament vial 210 along the track 220. The stopping element 283 may take the form of a wall, for example. The terminal track section support surface 281 may be substantially flat and horizontal to slow the medicament vial 210.

As shown in FIG. 2B, the terminal track section support surface 281 may be coupled to the support surface 250 such that they form a continuous, smooth surface.

Additionally/alternatively, the terminal track section lateral walls 282*a*, 282*b* may be coupled to respective lateral guide walls 260*a*, 260*b* such they form continuous walls as shown in FIG. 2B.

The terminal track section 280 may be configured to retain a plurality of medicament vials 210 simultaneously. This may be beneficial for a user preparing a plurality of medicament vials 210 in close succession, for example where the medicaments contained in the plurality of medicament vials 210 are subsequently to be pooled prior to administration to a patient.

To use the medical device 200, a user (who may be the patient, or a person other than the patient such a clinician or non-clinician caregiver for the patient) may position the medicament vial 210 containing a medicament (e.g., medicament 106) on the track 220 at the initial position 221, for example via the entry aperture 270*a*. The user may position the medicament vial 210 at the initial position 221 such that the longitudinal axis (e.g., axis A-A') is substantially horizontal and such that the outer circumferential surface 211 of the medicament vial 210 contacts the support surface 250 of the track 220. The user may subsequently release the medicament vial 210 such that the medicament vial 210 may roll along the track 220 under gravity, following the path P, to mix the medicament within the medicament vial 210.

The medicament device 200 may provide one or more improvements in the preparation of a medicament for administration. The simplicity of the using the medicament device 200 can allow it to be used by lay users (e.g., patients and/or non-clinician caregivers) for complex medicament preparation in a home setting, for example medicament preparations for enzyme replacement therapies. Nevertheless, the medical device 200 may also be used by non-lay users such as healthcare professionals (e.g., travelling nurses in a home setting or clinicians in a clinical setting) to assist in the preparation of medicaments.

After preparing a medicament in the medicament vial 210 (e.g., adding one or more medicament constituents into the medicament vial 210), a user may roll the medicament vial down the track 220 of the medicament device 200 to mix the medicament. The medicament in the medicament vial 210 will be passively mixed by the medical device 200. As the medicament vial 210 is rolling along the track 220, the user may be preparing the next medicament vial 210 to be rolled down the track 220. As such, the medicament device 200 may increase the efficiency of multiple-vial medicament preparation, since the user is no longer required to perform the mixing of the medicament by hand (e.g., by rolling the medicament vial 210 between their hands) and can instead proceed to the next medicament vial. The overall time to prepare a plurality of medicament vials may therefore be reduced.

Additionally, the medical device 200 may allow the mixing of the medicament in the medicament vial 210 to be performed in a more predictable and/or tuneable manner compared to one or more previous methods of mixing (such as rolling the medicament vial between the user's hands). The shape and/or length of the track 220 may be selected such that it mixes the medicament in a desirable manner (e.g., for a predetermined range of time, and/or a predetermined intensity of mixing). This may reduce the risk of damaging the medicament (e.g., through protein aggregation) that may result from improper manipulations (e.g., shaking) of the medicament vial 210 by lay users.

One or more of an incline angle, shape and length of the track 220 can be selected such that the roll (and resultant swirling) of the medicament in the medicament vial 210 is gentle and not sufficient to generate undesirable agitation of the medicament (e.g. shaking, frothing, etc.). For instance, in one or more examples, the track may be configured such that the medicament vial 210 can continuously roll along the track 220 for between five and one hundred and twenty seconds. In one or more examples, the track may be configured such that the medicament vial 210 can continuously roll along the track 220 for between five and sixty seconds.

Figure 3:
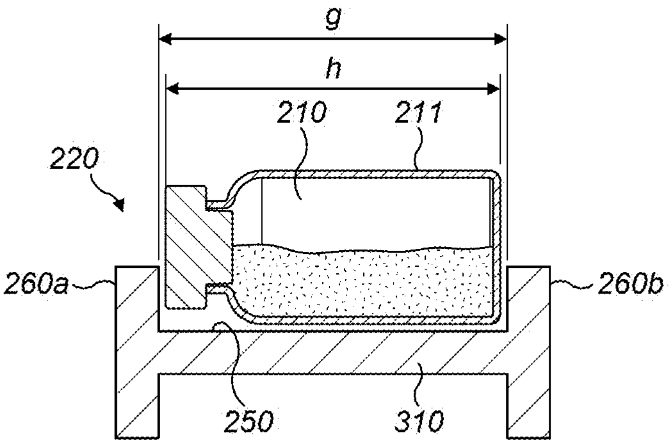
FIG. 3 shows a cross-section of a track in accordance with one or more embodiments of the present disclosure.

FIG. 3 shows a cross-section of the track 220 previously described in relation to FIGS. 2A-2C, wherein the cross-section is along section C-C' of the track 220 shown in FIG. 2C.

As shown in FIG. 3, and as previously described in relation to FIGS. 2A-2C, the track 220 comprises a support surface 250 along which the medicament vial 210 is guided to roll. The support surface 250 may be formed as the upper surface of a substantially flat support member 310.

The support surface 250 has a width g that may substantially correspond to a height h of the medicament vial 210 such that medicament vial 210 is supported by the support surface 250 on its outer circumferential surface 211 and is able to freely roll along the track 230. The width g may be marginally greater than the height h of the medicament vial 210. The height h may be a height of the body (e.g., body 102) of the medicament vial 210, a height of the body and shoulder portion (e.g. shoulder portion 110) of the medicament vial 210, or a maximum height of the medicament vial 210, for example. The width g may be between 1 cm and 20 cm, between 2 cm and 10 cm, or between 3 cm and 7 cm, for example.

In some examples, the width g may be selected to be specific to the dimensions of a particular medicament vial 210, to inhibit a user from placing an incorrect medicament vial into the medical device 200 (e.g. an incorrect medicament vial that is substantially larger than the medicament vial 210). This may be desirable as a method of enforcing proper medicament preparation by lay users.

FIG. 3 shows the lateral guide walls 260*a*, 260*b* of the track 220 in greater detail. As discussed previously, the lateral guide walls 260*a*, 260*b* are arranged to retain the medicament vial 210 on the support surface 250 as the medicament vial 210 rolls along the track 220, to guide the medicament vial along a predetermined path P. FIG. 3 shows a first lateral guide wall 260*a* arranged along a first edge of the support surface 250 and extending upwards from the first edge. The first lateral guide wall 260*a* inhibits the medicament vial 210 from rolling off the first edge of the support surface 250.

FIG. 3 shows a second lateral guide wall 260*b* is arranged along a second edge of the support surface 250 that is opposite the first edge of the support surface 250, the first and second lateral guide walls 260*a*, 260*b* arranged at opposite sides of the support surface 250 such that the medicament vial 210 may roll between the first and second lateral guide walls 260*a*, 260*b* as it rolls along the track 220.

In some examples, at least one of the first lateral guide wall 260*a* and the second lateral guide wall 260*b* may be formed as a respective lip along an edge of the support surface 250. In some examples, for example as shown in FIG. 3, the first lateral guide surface 260*a* and second lateral guide surface 260*b* may extend above and below the support surface 250 such that the medical device 200 may also be used upside down.

Figure 4:
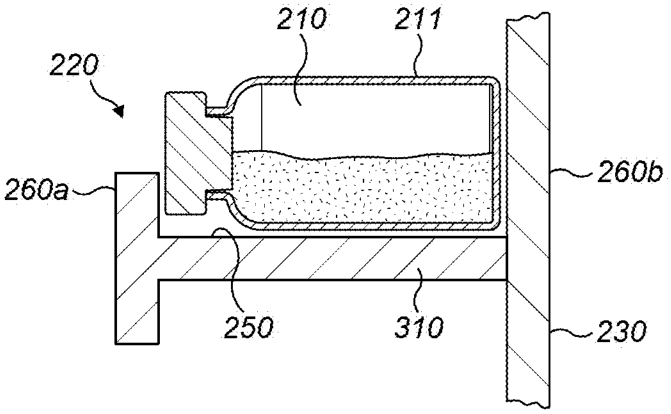
FIG. 4 shows a cross-section of an alternative track in accordance with one or more embodiments of the present disclosure.

FIG. 4 shows an alternative cross-section of the track 220 according to one or more embodiments. The track 220 shown in FIG. 4 is similar to the track 220 described in relation to FIG. 3, however one edge of the support surface 250 is coupled to a wall (e.g., front wall 231, rear wall 235, first side wall 233 or second side wall 234) of the housing 230, allowing at least a portion of the wall of the housing 230 to act as the second lateral guide rail 260*b*.

In some examples, both the first lateral guide wall 260*a* and the second lateral guide wall 260*b* may comprise at least a portion of respective walls of the housing 230.

Figure 5:
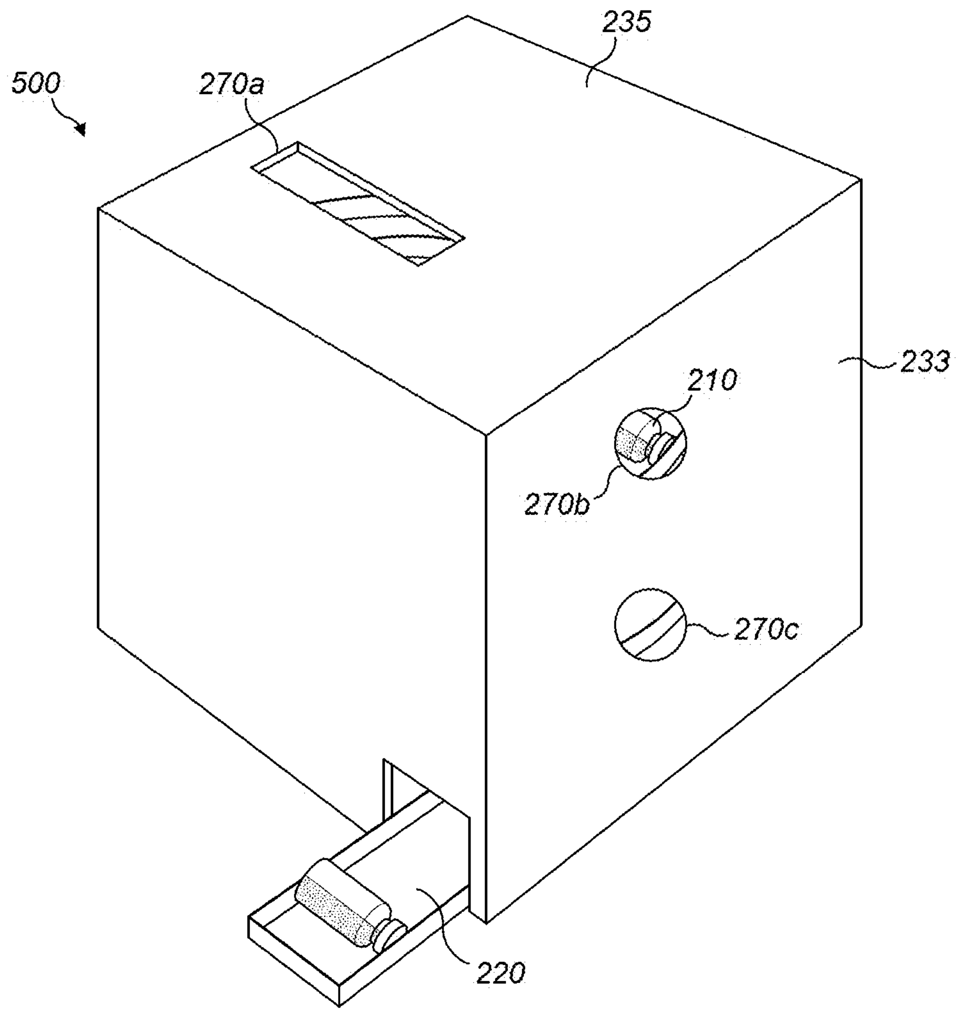
FIG. 5 shows a perspective view of a medical device according to a second embodiment of the present disclosure.

FIG. 5 shows a medical device 500 according to one or more embodiments of the present disclosure. The medical device 500 may be similar or identical to the medical device 200 previously described in relation to FIGS. 2A-2C, however in this example the housing 230 comprises a plurality of entry apertures 270*a-c*. Each entry aperture of the plurality of entry apertures 270*a-c* allows the medicament vial 210 to be positioned onto a different corresponding position on the track 230. For example, each entry aperture 270*a-c* is arranged such that it allows the user to position the medicament vial 210 at a different respective location on the track 230 by inserting the medicament vial 210 through a particular entry aperture 270*a-c*.

FIG. 5 shows a first entry aperture 270*a* arranged at a top wall 235 of the housing 230 of the medical device 200, in a similar manner as described in relation to FIG. 2A, and a second entry aperture 270*b* and third entry aperture 270*c* each arranged at a first side wall 233 of the housing 230 of the medical device 200, the second entry aperture 270*b* vertically spaced from the third entry aperture 270*c*. However, it should be understood that this is not meant to be limiting, and that in one or more other examples the medical device 500 may have fewer or greater than three entry apertures 270*a-c*, and/or one or more of the entry apertures 270*a-c* may be arranged at a different position in the housing 230 to that shown in FIG. 5.

In some examples, the entry apertures 270*a-c* are configured to selectively provide access to the track 220 according to the size and orientation of the medicament vial 210 (e.g., inhibiting a user from placing an incorrect medicament vial that is substantially larger than the required medicament vial 210). To extend the above example, the width and length entry aperture 270*a* may be correspond to the diameter and height of medicament vial 210, while the diameters of entry apertures 270*b* and 270*c* may correspond to the diameter of medicament vial 210. In other examples, entry apertures 270*a-c* are configured to allow access to track 220 by a smaller vial 210 than the maximum configured (i.e., allowable) for track 220, while rejecting (i.e., not fitting, supporting, accessing) those vials 210 larger than those for which the apparatus is intended.

While it has been described in relation to FIGS. 2A-2C that at least a portion of the track 220 may be substantially helical, it should be understood that in one or more other examples the track 220 may take a different form to helical, as now described.

Figure 6:
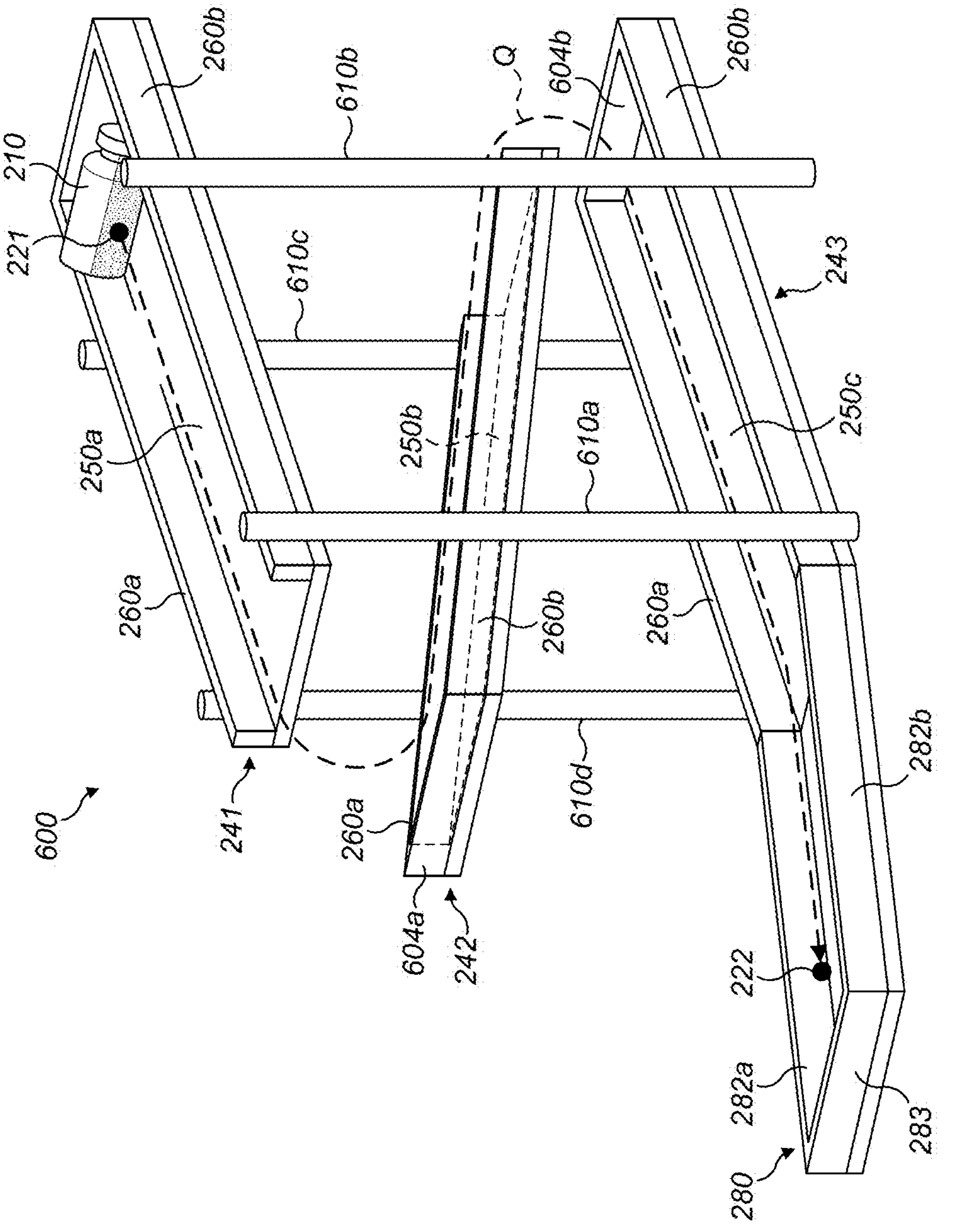
FIG. 6 shows a perspective view of a medical device according to a third embodiment of the present disclosure.

FIG. 6 shows a medicament device 600 according to one or more embodiments. The medicament device 600 may be similar or identical to the medicament device 200, however the arrangement of the track 220 takes a different form in the medical device 600 compared to the medical device 200.

As shown in FIG. 6, the track 220 comprises a plurality of discrete track sections, in this example the plurality of discrete track sections comprising a first track section 241, a second track section 242 and a third track section 243. However, it should be understood that this is by way of example only, and that in other examples the track 220 may comprise only two discrete track sections, or greater than three discrete track sections (e.g., four discrete track sections, five discrete track sections, etc.).

Each track section 241, 242, 243 comprises a corresponding support surface 250*a*, 250*b*, 250*c* that may be similar or identical to the support surface 250 previously described in relation to FIGS. 2A-2C. Furthermore, each track section 241, 242, 243 may comprise at least one lateral guide wall 260*a*, 260*b* that may be similar or identical to the lateral guide walls 260*a*, 260*b* previously described in relation to FIGS. 2A-2C.

The plurality of discrete track sections are arranged such that the medicament vial 210 is guided to roll along each discrete track section 241, 242, 243 of the plurality of discrete track sections sequentially under gravity (i.e., the medicament vial 210 is guided to roll along the first track section 241, followed by the second track section 242, followed by the third track section 243).

As shown in FIG. 6, the plurality of discrete track sections may be vertically stacked such that the plurality of discrete track sections guide the medicament vial 210 to roll in a substantially zigzagging path Q, from an initial position 221 on the track 220 to a final position 222 on the track 220. As shown in FIG. 6, the second track section 242 is arranged vertically above the third track section 243, and the first track section 241 is arranged vertically above the second track section 241, with each of the first track section 241, second track section 242 and third track section 243 substantially aligned, but with alternating inclines.

The inclined first track section 241 is configured to guide the medicament vial 210 to roll along a substantially straight first path in a first direction, while the inclined second track section 242 is configured to guide the medicament vial 210 to roll along a substantially straight second path in a second direction that is different to the first direction. A horizontal component of the first direction may be in a substantially opposite direction to a horizontal component of the second direction. The inclined third track section 243 may be configured to guide the medicament vial 210 to roll along a substantially straight third path in a third direction substantially parallel to the first direction.

The vertical distance two discrete track sections 241, 242, 243 consecutive along path Q may be selected to minimise improper manipulations (e.g., dropping) of the medicament vial 210 as it moves between consecutive track sections 241, 242, 243, which dropping may in some instances damage the medicament vial 210 or the contents therein. It will be appreciated that the vertical distance between an end of a track section 241, 242 and the start of the next track section 242, 243 along the path Q shall not be less than the diameter of medicament vial 210 (and, therefore, shall not inhibit the travel of medicament vial 210 along path Q).

The plurality of track sections may be held in a fixed configuration by any suitable support structure. FIG. 6 shows a support structure comprising a first support element 610*a*, second support element 610*b*, third support element 610*c* and fourth support element 610*d*, each support element 610*a-d* coupled to each track section 241, 242, 243 to hold the track sections in fixed positions relative to each other. However, it should be understood that this is not meant to be limiting, and that in other examples a different number and/or arrangement of support elements 610*a-d* may be used, or a different form of support structure may be used to that depicted in FIG. 6.

FIG. 6 shows the medical device 600 may also comprise a terminal track section 280, which may be similar or identical to a terminal track section 280 previously described in relation to FIGS. 2A-2C (e.g., may comprise a pair of terminal track lateral walls 282*a,b* and a stopping element 283).

While FIG. 6 does not show a housing containing at least a portion of the track 220, it should be understood that this is not meant to be limiting and that in some examples the medical device 600 may comprise a housing (e.g., similar or identical to the housing 230 described in relation to FIGS. 2A-2C and/or FIG. 5). In such examples, the housing may comprise one or more entry apertures (e.g., similar to the entry apertures 270*a-c*) and/or an exit aperture (e.g., similar to the exit aperture 272).

Figure 7:
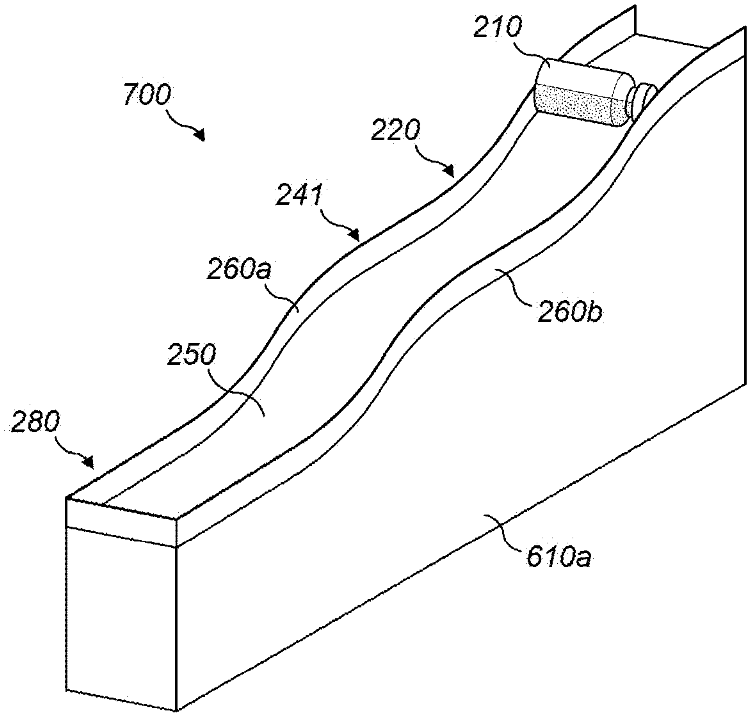
FIG. 7 shows a perspective view of a medical device according to a third embodiment of the present disclosure.

FIG. 7 shows a medicament device 700 according to one or more other embodiments. One or more aspects of the medical device 700 may be similar or identical to the medical device 200 and/or medical device 600. As shown in FIG. 7, the track 220 comprises an inclined first track section 241 configured to guide the medicament vial 210 to follow a substantially linear path as it rolls along the track 220 under gravity. The first track section 241 may comprise a support surface 250 that may be similar or identical to the support surface 250 previously described in relation to FIGS. 2A-2C, and optionally one or a pair of lateral guide walls 260*a*, 260*b* that may be similar or identical to the lateral guide walls 260*a*, 260*b* previously described in relation to FIGS. 2A-2C. The track 220 may also comprise a terminal track section 280, which may comprise one or more similar feature to the terminal track section 280 described in relation to FIGS. 2A-2C. FIG. 7 shows the first track section 241 being supported by a wedge-shaped support element 610*a*.

As shown in FIG. 7, the support surface 250 has an incline that varies along the length of the support surface 250 (e.g., the incline varies along the first track section 241). This variation in incline may be beneficial in moderating the speed at which the medicament vial 210 travels along the track 220. For example, the support surface 250 may initially have a steep incline near an initial position on the track, with the incline decreasing along the support surface 250 (in the direction travelled by the medicament vial 210). Such a configuration may allow the medicament vial 210 to quickly accelerate once the medicament vial is first released on the track 210, but for the acceleration to be gradually reduced as the medicament vial 210 continues its path down the track 220, to prevent the medicament vial 210 from reaching a speed that would be too great (and therefore that may damage the medicament contained within). As shown in FIG. 7, the support surface 250 may be undulating.

Figure 8:
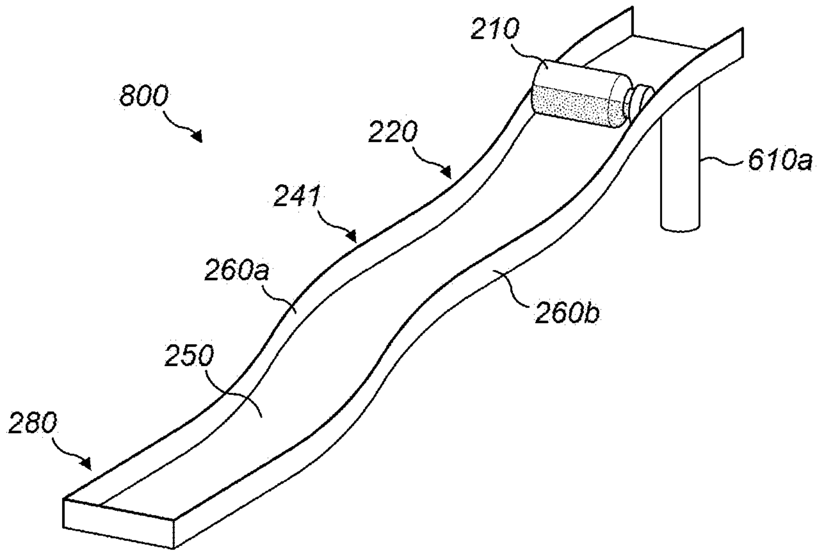
FIG. 8 shows a perspective view of a medical device according to a third embodiment of the present disclosure.

FIG. 8 shows a medicament device 800 that is similar or identical to the medicament device 700, however the support element 610*a* instead takes the form of a vertically-oriented support beam arranged to support an upper end of the track 220.

Figure 9:
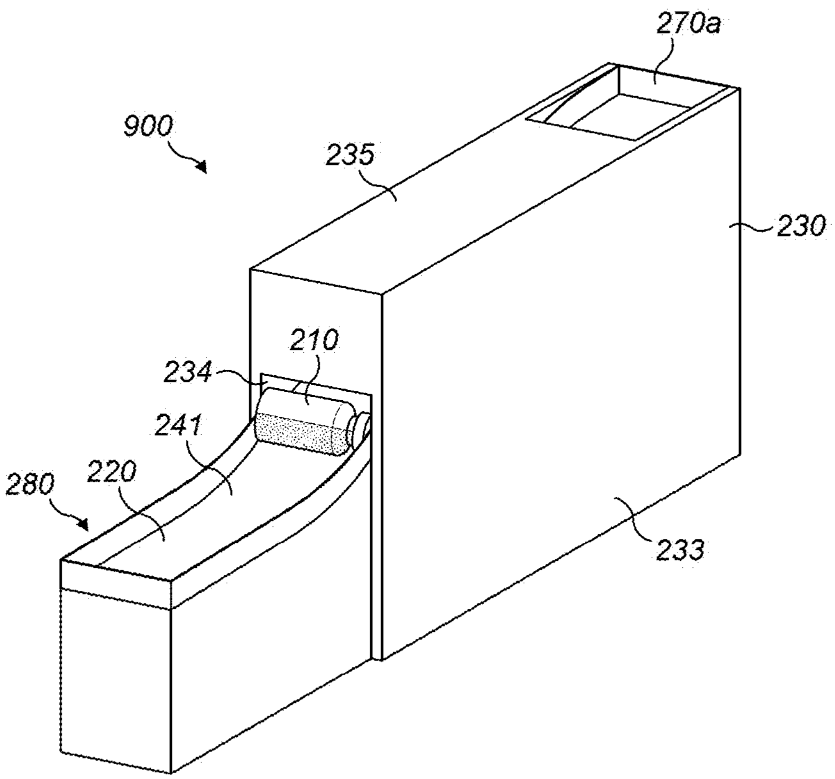
FIG. 9 shows a perspective view of a medical device according to a third embodiment of the present disclosure.

FIG. 9 shows a medicament device 900 that is similar or identical to the medicament device 700, however the medical device 900 comprises a housing 230 that contains at least a portion of the track 220. An entry aperture 270*a* is arranged at a top wall 235 of the housing 230 to allow a user to place the medicament vial 210 on the track 220 via the entry aperture 270*a*, in a similar manner as described in relation to the medical device 200. FIG. 9 further shows that the side walls 233, 234 of the housing 230 may act as lateral guide walls 260*a*, 260*b* for the track 220, for at least a portion of the track 220.

While it has been generally described in various embodiments that the track 220 is partially located within a housing (e.g., housing 230), it should be understood that this is by way of example only, and that in other examples the track is entirely located within a housing, or is not located within a housing. Furthermore, in embodiments where a housing is not described, it should be understood that in variations of those embodiments, the track may be partially or completely contained within a housing (e.g., in a similar or identical manner to the medical device 200).

Figure 10:
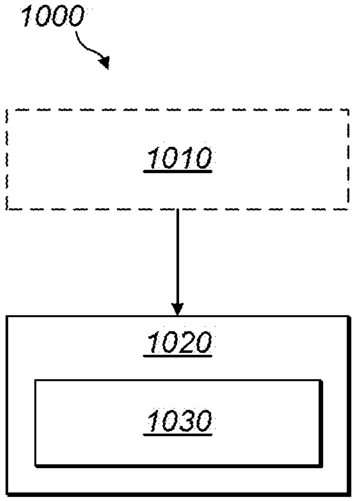
FIG. 10 shows a flowchart representing a method according to one or more embodiments of the present disclosure.

FIG. 10 shows a method 1000 according to one or more aspects of the present disclosure wherein the method 1000 is a method for using one or more medical devices disclosed herein (e.g., one or more of medical device 200, medical device 500, medical device 600, medical device 700, medical device 800 and medical device 900) to mix a medicament contained in a medicament vial disclosed herein (e.g., a medicament vial 100).

Prior to step 1010 and/or step 1020 of the method 1000, the medicament, or one or more medicament constituents, may have been introduced into the medicament vial, for example via a hollow needle inserted through a stopper of the medicament vial.

The medicament may comprise a lyophilized drug and a diluent, for example. However, this is not meant to be limiting and in other examples the medicament may comprise one or more medicaments or medicament constituents other than a lyophilized drug and a diluent, such as two different liquid medicament constituents, or a non-lyophilized drug and a diluent.

An optional step 1010 of the method 1000 comprises positioning the medicament vial at an initial position on a track (e.g., track 220) of the medical device. A user may position the medicament vial at the initial position on the track by hand, for example by positioning the medicament vial at the initial position through an entry aperture (e.g., one of entry apertures 270*a-c*) of a housing (e.g., housing 230) of the medical device.

Step 1020 of the method 1000 comprises causing the medicament vial to roll along the track of the medical device to mix the medicament contained within the medicament vial. Causing the medicament vial to roll along a track of the medical device to mix the medicament contained within the medicament vial may comprise a step 1030 of releasing the medicament vial at the initial position on the track such that the medicament vial rolls along the track to mix the medicament. For example, the user may release the medicament vial from their hand, allowing the medicament vial to roll along the track under gravity.

In some examples, after step 1010 and step 1020 has been performed, step 1010 and step 1020 may be repeated for one or more additional medicament vials, with the one or more additional medicament vials rolled down the track of the medicament device to mix the medicament contained within that vial. In some examples, each medicament vial may roll along the track while the user prepares the next medicament vial to be rolled down the track, wherein such preparation may comprise adding one or more medicaments or medicament constituents into the medicament vial. The plurality of medicament vials may collect and be held in the terminal track portion after they have rolled along the track, awaiting removal by the user.

In some examples, after step 1010 and step 1020 have been performed, step 1010 and step 1020 may be repeated for the same medicament vial 210 to provide additional mixing of the medicament. This repeated process may be desirable to further reduce the outer dimension of one or more medical devices disclosed herein.

After the medicament vials have been mixed using the medical device, the vials may then be used in a subsequent medicament preparation process. For example, the medicament in each medicament vial may be pooled by transferring the medicament in each medicament vial into a container such as an IV bag, ready for IV infusion to a patient. However, this is not meant to be limiting and the mixed medicament may be used in a different subsequent process.

While one or more aspects of the present disclosure have been described in the context of preparing a medicament for IV infusion, it should be understood that this is not meant to be limiting, and that in other examples the medicament may be prepared for administration by a different route than IV administration, for example, but not limited to, subcutaneous administration, oral administration, topical administration, intraosseous administration, intratracheal administration, sublingual administration or nasal administration.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., 2 about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively, or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g., a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrom. Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

Those of skill in the art will understand that modifications (additions and/or removals) of various components of the embodiments described herein may be made without departing from the full scope and spirit of the present invention, which encompass such modifications and any and all equivalents thereof.

LIST OF REFERENCE NUMBERS

100—medicament vial
101—circumferential outer surface
102—body
103—outlet
104—reservoir
105—end surface (of medicament vial)
106—medicament
108—neck portion
110—shoulder portion
112—stopper
114—flange
115—crimp cap
116—aperture
118—vial cap
200—medical device
210—medicament vial
211—outer circumferential surface (of medicament vial)
220—track
221—initial position (on track)
222—final position (on track)
230—housing
231—front wall
232—rear wall
233—first side wall
234—second side wall
235—top wall
236—bottom wall
241—first track section
242—second track section
243—third track section
250—support surface
260*a,b*—lateral guide walls
270*a-c*—entry aperture
272—exit aperture
280—terminal track section
281—terminal track section support surface
282,a,b—terminal track section lateral walls
283—stopping element
310—support member
600—medical device
610*a-d*—support element
1000—method
1010—first step (of method)
1020—second step (of method)
1030—third step (of method)

The invention claimed is:

1. A medical system for mixing a medicament, the system comprising:

a medicament vial containing the medicament, the medicament comprising a lyophilized drug and a diluent, the medicament vial comprising a cylindrical body extending along a longitudinal axis and defining a reservoir for containing the medicament, and a medical device comprising:

a track configured to support the medicament vial, the track comprising an inclined first track section arranged such that, in use, the medicament vial can roll along the track to mix the medicament contained within the medicament vial, the track having a width that corresponds to a height of the medicament vial, the track comprising a first lateral guide wall and a second lateral guide wall configured to inhibit a user from placing a medicament vial having a greater height than the width of the track into the medical device; and a housing containing the track and comprising a plurality of entry apertures spaced apart from each other, the plurality of entry apertures comprising a first entry aperture arranged on a horizontal top wall of the housing and a second entry aperture arranged on a vertical side wall of the housing, wherein the plurality of entry apertures are configured to selectively provide access to the track according to a size and orientation of the medicament vial, wherein each entry aperture of the plurality of entry apertures allows the medicament vial to be positioned onto a different corresponding position on the track.

2. The medical device of claim 1, wherein the first inclined track section is substantially helical such that, in use, the first inclined track section guides the medicament vial to roll along a substantially helical path.

3. The medical device of claim 1, wherein the track comprises a plurality of discrete track sections, the plurality of discrete track sections including the first track section, wherein the plurality of discrete track sections are arranged such that the medicament vial is guided to roll along each track section of the plurality of discrete track sections sequentially.

4. The medical device of claim 3, wherein the plurality of discrete track sections are vertically stacked such that the plurality of discrete track sections guide the medicament vial to roll in a substantially zigzagging path.

5. The medical device of claim 3, wherein the inclined first track section is configured to guide the medicament vial to roll along a substantially straight first path in a first direction, and wherein the plurality of discrete track sections further comprises an inclined second track section that is configured to guide the medicament vial to roll along a substantially straight second path in a second direction that is different to the first direction.

6. The medical device of claim 5, wherein, when the medical device is in use, a horizontal component of the first direction is in a substantially opposite direction to a horizontal component of the second direction.

7. The medical device of claim 1, wherein the first track section comprises a support surface along which the medicament vial is guided to roll, wherein the support surface is undulating.

8. The medical device of claim 1, wherein the first lateral guide wall is configured to retain the medicament vial on the track as the medicament vial rolls along the track.

9. The medical device of claim 8, wherein the track comprises a support surface along which the medicament vial is guided to roll, wherein the first lateral guide wall is arranged along a first edge of the support surface.

10. The medical device of claim 9, wherein the second lateral guide wall is configured to retain the medicament vial on the track as the medicament vial rolls along the track, wherein the second lateral guide wall is arranged along a second edge of the support surface that is opposite the first edge of the support surface.

11. The medical device of claim 1, wherein the track comprises a terminal track section configured to hold the medicament vial after the medicament vial has ceased rolling along the track, wherein the terminal track section comprises a stopping element configured to inhibit further rolling of the medicament vial.

12. The medical device of claim 1, wherein the track is configured such that the medicament vial can continuously roll along the track for between five and sixty seconds.

13. A system comprising:

a medicament vial containing a medicament, the medicament comprising a lyophilized drug and a diluent, the medicament vial comprising a cylindrical body extending along a longitudinal axis and defining a reservoir for containing the medicament; and a medical device for mixing the medicament contained within the medicament vial, the medical device comprising a track configured to support the medicament vial, the track comprising an inclined first track section arranged such that, in use, the medicament vial can roll along the track to mix the medicament contained within the medicament vial, the track having a width that corresponds to a height of the medicament vial, the track comprising a first lateral guide wall and a second lateral guide wall configured to inhibit a user from placing a medicament vial having a greater height than the width of the track into the medical device; and a housing containing the track and comprising a plurality of entry apertures spaced apart from each other, the plurality of entry apertures comprising a first entry aperture arranged on a horizontal top wall of the housing and a second entry aperture arranged on a vertical side wall of the housing, wherein the plurality of entry apertures are configured to selectively provide access to the track according to a size and orientation of the medicament vial, wherein each entry aperture of the plurality of entry apertures allows the medicament vial to be positioned onto a different corresponding position on the track.

14. A method for using a medical device for mixing a medicament contained within a medicament vial, the medicament vial comprising a cylindrical body extending a longitudinal axis and defining a reservoir for containing the medicament, the medicament comprising a lyophilized drug and a diluent, the medical device comprising a track configured to support the medicament vial, the track comprising an inclined first track section arranged such that, in use, the medicament vial can roll along the track to mix the medicament contained within the medicament vial, the track having a width that corresponds to a height of the medicament vial, the track comprising a first guide wall and a second lateral guide wall configured to inhibit a user from placing a medicament vial having a greater height than the width of the track into the medical device, the medical device comprising a housing containing the track and comprising a plurality of entry apertures spaced apart from each other, the plurality of entry apertures comprising a first entry aperture arranged on a horizontal top wall of the housing and a second entry aperture arranged on a vertical side wall of the housing, wherein the plurality of entry apertures are configured to selectively provide access to the track according to a size and orientation of the medicament vial, wherein each entry aperture of the plurality of entry apertures allows the medicament vial to be positioned onto a different corresponding position on the track the method comprising:

causing the medicament vial to roll along the track of the medical device to mix the medicament contained within the medicament vial.

15. The method of claim 14, further comprising positioning the medicament vial at an initial position on the track, wherein causing the medicament vial to roll along a track of the medical device to mix the medicament contained within the medicament vial comprises releasing the medicament vial at the initial position on the track such that the medicament vial rolls along the track to mix the medicament.

* * * * *